US012420278B2

(12) United States Patent
Kim et al.

(10) Patent No.: US 12,420,278 B2
(45) Date of Patent: Sep. 23, 2025

(54) METHOD OF MANUFACTURING MICROFLUIDIC CHANNEL WITH MEMBRANE FORMED THEREIN AND APPARATUS FOR FORMING MEMBRANE INSIDE THE MICROFLUIDIC CHANNEL

(71) Applicant: UNIST(ULSAN NATIONAL INSTITUTE OF SCIENCE AND TECHNOLOGY), Ulsan (KR)

(72) Inventors: Taesung Kim, Ulsan (KR); Sangjin Seo, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 541 days.

(21) Appl. No.: 17/978,212

(22) Filed: Nov. 1, 2022

(65) Prior Publication Data

US 2023/0338947 A1 Oct. 26, 2023

(30) Foreign Application Priority Data

Apr. 22, 2022 (KR) ........................ 10-2022-0050181

(51) Int. Cl.
*B01L 3/00* (2006.01)
*B81C 1/00* (2006.01)

(52) U.S. Cl.
CPC ... *B01L 3/502707* (2013.01); *B01L 3/502761* (2013.01); *B01L 2200/0647* (2013.01); (Continued)

(58) Field of Classification Search
CPC ......... B01L 3/502707; B01L 3/502761; B01L 2200/0647; B01L 2200/0678; (Continued)

(56) References Cited

U.S. PATENT DOCUMENTS 11,946,925 B2 * 4/2024 Xie .................... G01N 27/4163
2011/0158847 A1 * 6/2011 Charest ................ B01D 63/081 29/428

(Continued)

FOREIGN PATENT DOCUMENTS

KR 10-1325676 B1 11/2013
KR 10-2218278 B1 2/2021

OTHER PUBLICATIONS

Cédric Laval et al., "Fabrication of microscale materials with programmable composition gradients", Lab on a chip, 2016, Issue 7, pp. 1-9.

*Primary Examiner* — Brian J. Sines
(74) *Attorney, Agent, or Firm* — Revolution IP, PLLC

(57) ABSTRACT

Provided is a method of manufacturing a microfluidic channel with a membrane formed therein, the method including: preparing an apparatus for forming a membrane, the apparatus for forming the membrane including a first microfluidic channel, a second microfluidic channel being spaced apart from the first microfluidic channel, a bridge channel having a microchannel structure for communicating the first microfluidic channel and the second microfluidic channel with each other, and a control channel, which is partitioned by a gas permeable member from the bridge channel and through which gas flows; a fluid flowing operation in which a first fluid in a liquid state for moving first microparticles flows in the first microfluidic channel and a control gas in a gaseous state flows in the control channel; and forming a membrane having nanopores.

16 Claims, 8 Drawing Sheets

(52) U.S. Cl.
CPC ... *B01L 2200/0678* (2013.01); *B01L 2200/12* (2013.01); *B01L 2300/123* (2013.01)

(58) Field of Classification Search
CPC ........... B01L 2200/12; B01L 2300/123; B01L 2300/0896
See application file for complete search history.

(56) References Cited

U.S. PATENT DOCUMENTS

| | | | | |
|---|---|---|---|---|
| 2021/0114030 | A1* | 4/2021 | Leslie | C12M 23/16 |
| 2021/0237079 | A1* | 8/2021 | Tews | B81B 1/006 |
| 2023/0228732 | A1* | 7/2023 | Xie | G01N 33/48721<br>422/68.1 |

* cited by examiner

【FIG. 1】
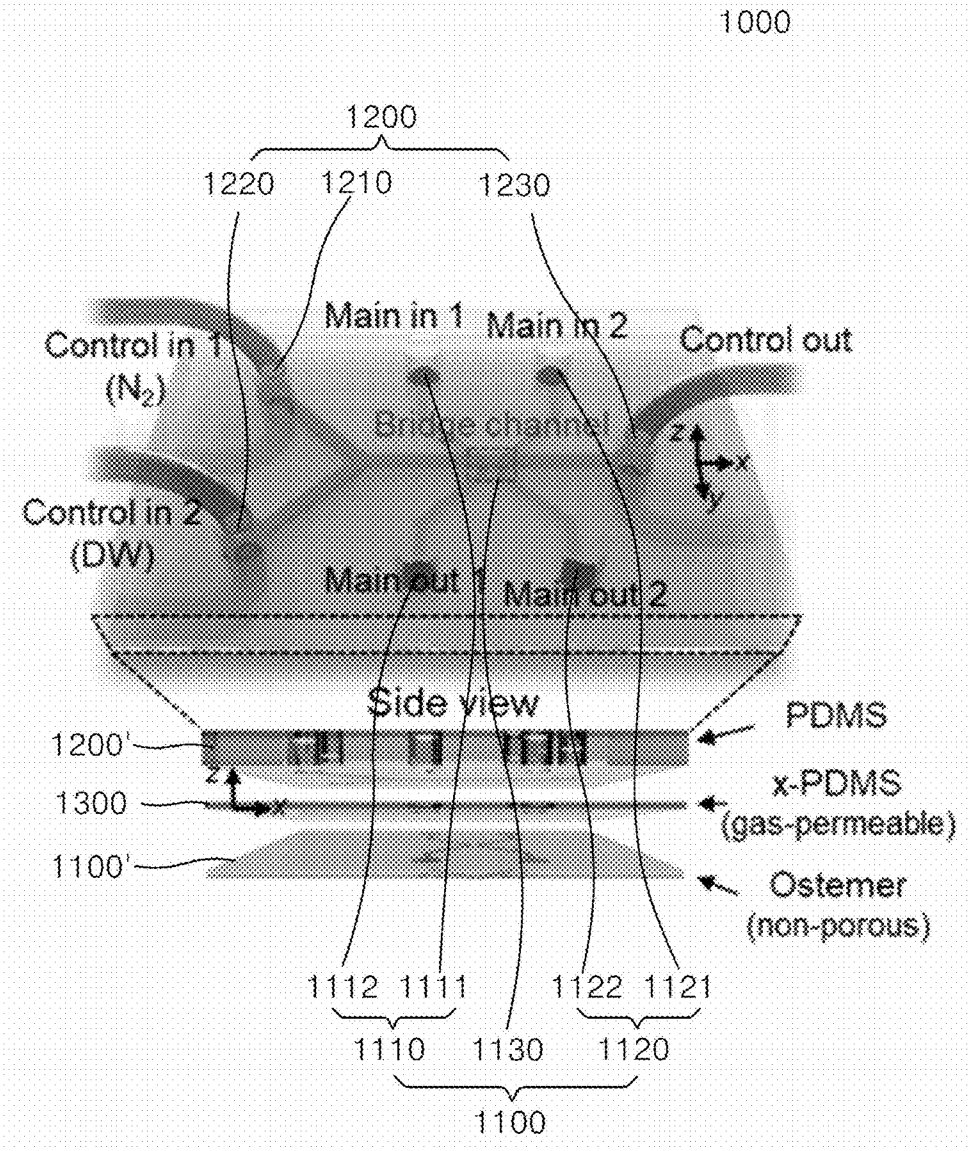

【FIG. 2】
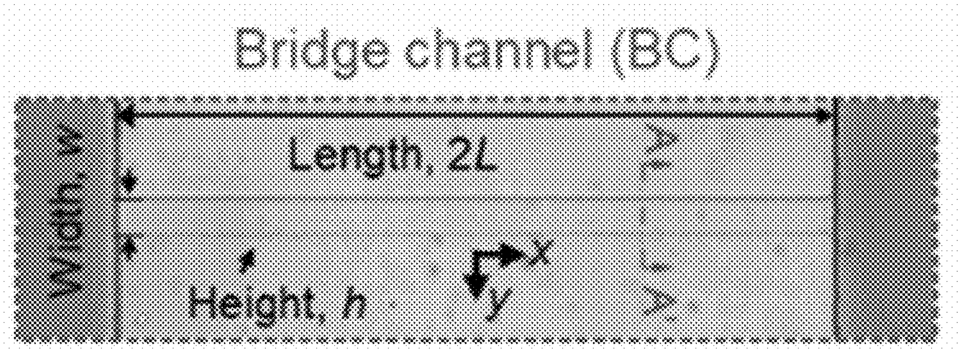
(a)
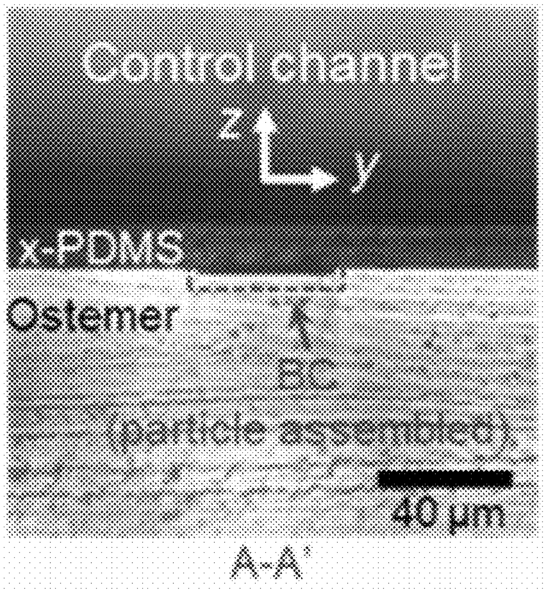
A-A'
(b)
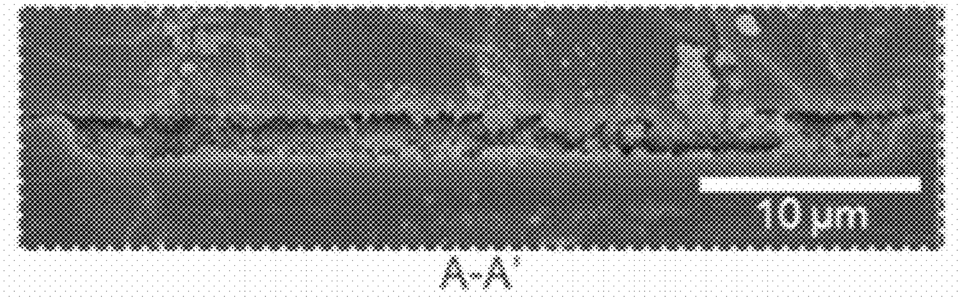
A-A'
(c)

【FIG. 3】
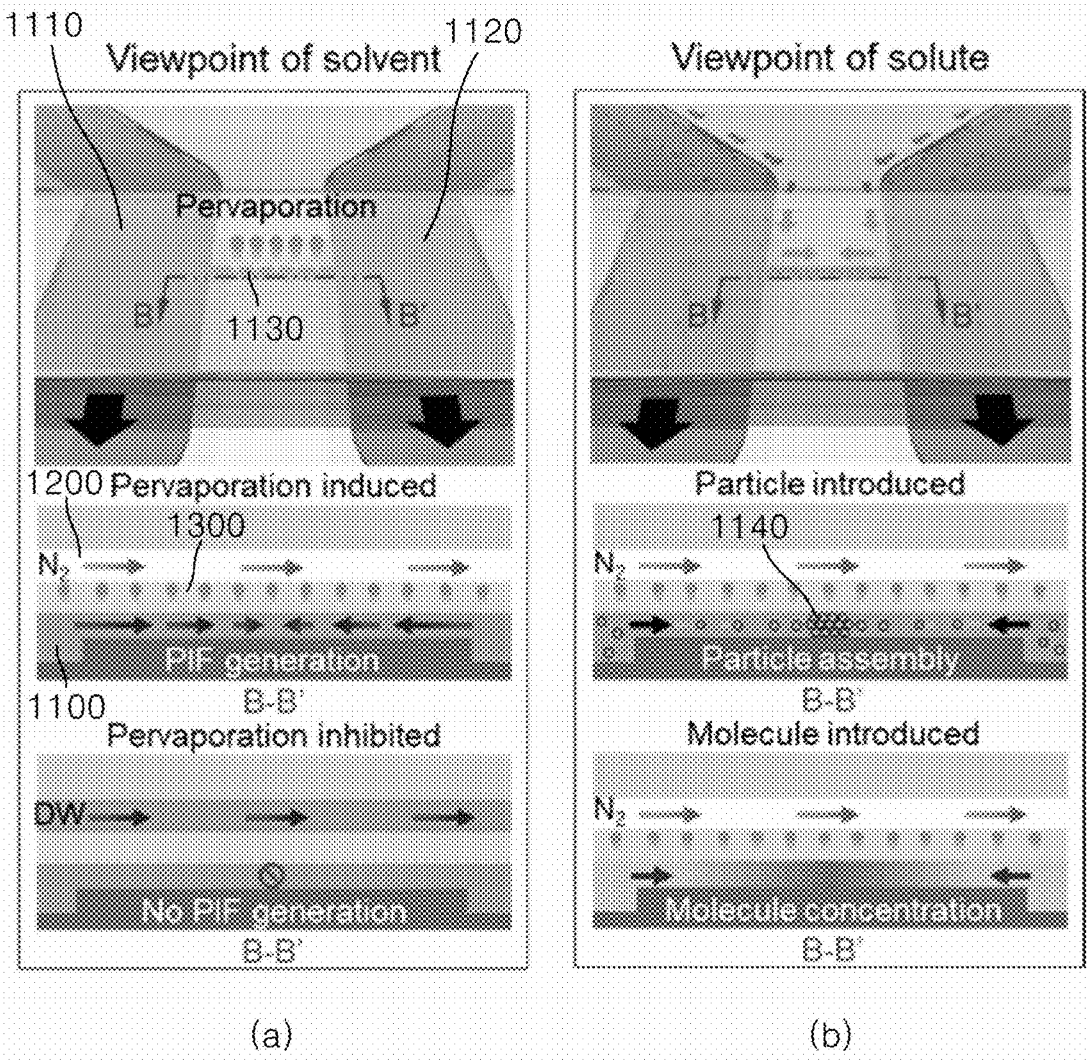

【FIG. 8】
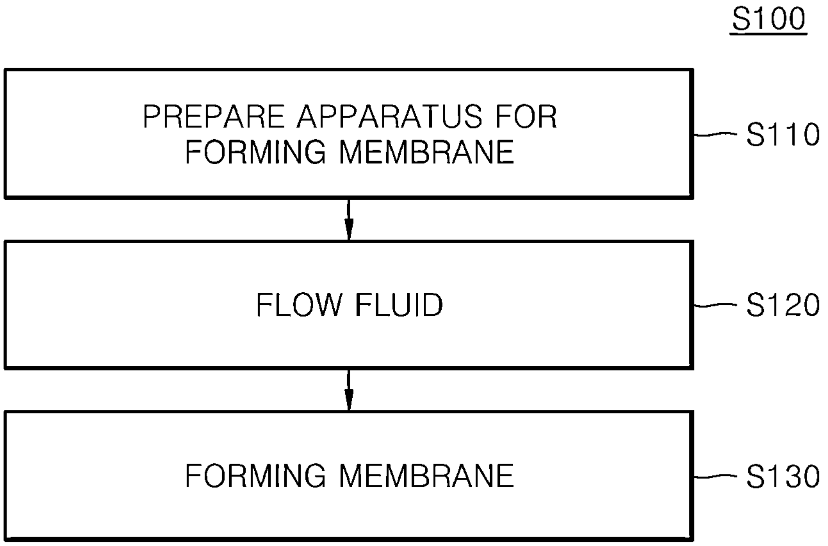

METHOD OF MANUFACTURING MICROFLUIDIC CHANNEL WITH MEMBRANE FORMED THEREIN AND APPARATUS FOR FORMING MEMBRANE INSIDE THE MICROFLUIDIC CHANNEL

CROSS-REFERENCE TO RELATED APPLICATION

This application claims the benefit of Korean Patent Application No. 10-2022-0050181, filed on Apr. 22, 2022, in the Korean Intellectual Property Office, the disclosure of which is incorporated herein in its entirety by reference.

TECHNICAL FIELD

The present invention relates to a method of manufacturing a microfluidic channel with a membrane formed therein and an apparatus for forming a membrane inside the microfluidic channel, and more particularly, to a method of manufacturing a microfluidic channel with a membrane formed therein, whereby particles are assembled inside the microfluidic channel by using a pervaporation-induced flow so that the membrane having nanopores can be formed, and an apparatus for forming a membrane inside the microfluidic channel.

BACKGROUND ART

In general, polymer membranes are porous membranes and can be used to selectively deliver specific ingredients or molecules to an opposite side. In an example, the polymer membranes can be used in the field of biomedical applications to separate a solution, gas or the like and to deliver specific ingredients or molecules.

However, in a method of manufacturing a polymer membrane according to the related art, the method is complicated to manufacture a membrane that may comply with various requirements. In detail, in the method of manufacturing a polymer membrane according to the related art, it is difficult to adjust the porosity of the membrane, and there is a limitation in manufacturing heterogeneous membrane serially arranged, and a complicated process is required to manufacture a plurality of membranes in parallel.

DISCLOSURE OF THE INVENTION

The present invention provides a method of manufacturing a microfluidic channel with a membrane formed therein, whereby particles are assembled inside the microfluidic channel by using a pervaporation-induced flow so that the membrane having nanopores can be formed, and an apparatus for forming a membrane inside the microfluidic channel.

According to an aspect of the present invention, there is provided a method of manufacturing a microfluidic channel with a membrane formed therein, the method including: preparing an apparatus for forming a membrane, the apparatus for forming the membrane including a first microfluidic channel, a second microfluidic channel being spaced apart from the first microfluidic channel, a bridge channel having a microchannel structure for communicating the first microfluidic channel and the second microfluidic channel with each other, and a control channel, which is partitioned by a gas permeable member from the bridge channel and through which gas flows; a fluid flowing operation in which a first fluid in a liquid state for moving first microparticles flows in the first microfluidic channel and a control gas in a gaseous state flows in the control channel; and forming a membrane having nanopores while the first fluid in the bridge channel is pervaporated to the control channel by flow of the control gas through the gas permeable member and the first microparticles that are moved together by the first fluid are stagnate in the bridge channel.

According to another aspect of the present invention, there is provided an apparatus for forming a membrane inside a microfluidic channel, the apparatus including: a first microfluidic channel; a second microfluidic channel being spaced apart from the first microfluidic channel; a bridge channel having a microfluidic channel structure in which the first microfluidic channel and the second microfluidic channel communicate with each other; and a control channel, which is partitioned by a gas permeable member from the bridge channel and through which a control gas in a gaseous state flows, while the first fluid in the bridge channel is pervaporated to the control channel by flow of the control gas through the gas permeable member and the first microparticles that are moved together by the first fluid are stagnate in the bridge channel, a membrane having nanopores is formed.

A method of manufacturing a microfluidic channel and an apparatus for forming a membrane inside the microfluidic channel according to the present invention have the following effects.

First, particles are assembled to the center of a bridge channel by using a pervaporation-induced flow so that a membrane having nanopores can be easily formed.

Second, the sizes of microparticles that are moved together by a fluid are controlled so that the sizes of the pores can be easily controlled.

Third, the types of the microparticles injected are diversified so that a heterogeneous membrane serial array can be easily manufactured.

Fourth, the types of the microparticles injected vary so that the material characteristics of the membrane can be easily controlled according to the selection of the particles.

BRIEF DESCRIPTION OF THE DRAWINGS

FIG. 1 is a schematic diagram of an apparatus for forming a membrane inside a microfluidic channel according to an embodiment of the present invention;

FIG. 2 is a schematic diagram and photos for enlarging a bridge channel and a control channel of the apparatus for forming the membrane inside the microfluidic channel shown in FIG. 1;

FIG. 3 is a schematic diagram illustrating a principle in which a pervaporation-induced flow is generated by the apparatus for forming the membrane inside the microfluidic channel shown in FIG. 1 and a membrane having nanopores is formed;

FIG. 8 is a block diagram illustrating a method of manufacturing a microfluidic channel with a membrane formed therein by using the apparatus for forming the membrane inside the microfluidic channel shown in FIG. 1.

DETAILED DESCRIPTION FOR CARRYING OUT THE INVENTION

Figure 4:
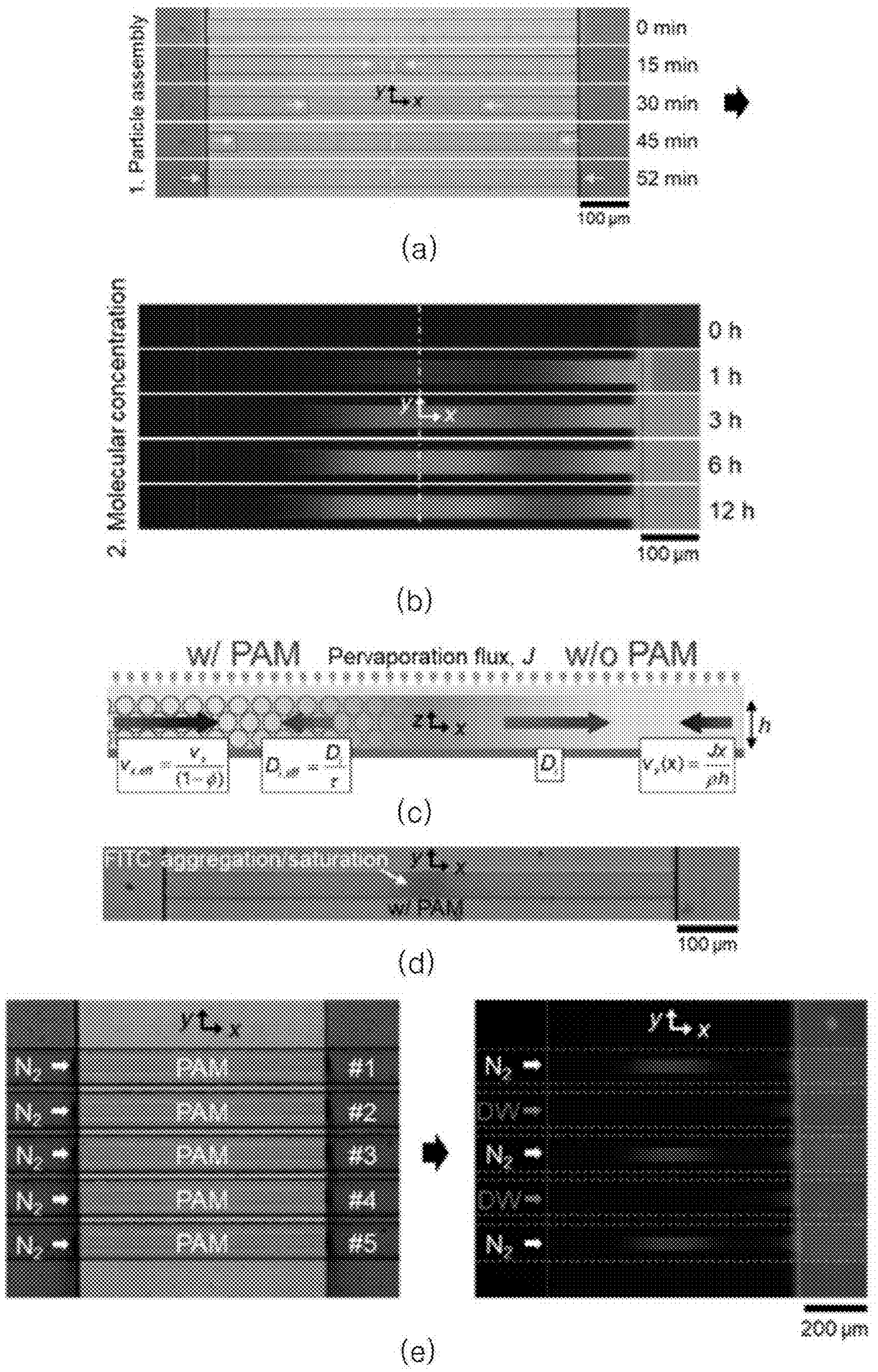
FIG. 4 shows experimental data illustrating an experimental state in which it is checked that the pervaporation-induced flow is generated by the apparatus for forming the membrane inside the microfluidic channel shown in FIG. 1.

Hereinafter, the present invention will be described in detail with reference to the accompanying drawings, in which exemplary embodiments of the invention are shown.

Referring to FIGS. 1 through 8, a method of manufacturing a microfluidic channel with a membrane formed therein (S100) according to an embodiment of the present invention includes preparing an apparatus for forming a membrane (S110), flowing a fluid (S120), and forming a membrane (S130). In the preparing of the apparatus for forming the membrane (S110), a main channel 1100, a control channel 1200, and a gas permeable member 1300 are prepared. The main channel 1100 includes a first microfluidic channel 1110, a second microfluidic channel 1120, and a bridge channel 1130. In the preparing of the apparatus for forming the membrane (S110), a first microfluidic channel 1110, a second microfluidic channel 1120, and a bridge channel 1130 are formed as a housing assembly 1100' integrated with the inside of a housing formed of an Ostemer resin having no air permeability. The housing assembly 1100' formed of the Ostemer resin is an open before an upper portion of each of the first microfluidic channel 1110, the second microfluidic channel 1120 and the bridge channel 1130 is combined with the gas permeable member 1300. The control channel 1200 is formed as a control channel assembly body 1200' inside a housing formed of a polydimethylsiloxane (PDMS) material. In this case, at least portion corresponding to the bridge channel 1130 of the control channel 1200 has a gas-permeable structure. The housing assembly 1100' including the main channel 1100, the gas permeable member 1300, and the control channel assembly body 1200' including the control channel 1200 are arranged in a vertical direction and in parallel. In this regard, the apparatus for forming the membrane will be first described with reference to FIGS. 1 through 7.

An apparatus 1000 for forming a membrane inside a microfluidic channel includes a main channel 1100, a control channel 1200, and a gas permeable member 1300. The main channel 1100 includes a first microfluidic channel 1110, a second microfluidic channel 1120, and a bridge channel 1130. The first microfluidic channel 1110 is a passage in which a first fluid flows. In the present embodiment, for example, the first microfluidic channel 1110 is formed in a micro size. The first microfluidic channel 1110 includes a first microfluidic channel inlet 1111 and a first microfluidic channel outlet 1112. The first microfluidic channel 1110 extends in a y-axis direction with respect to a plane including the main channel 1100 (for example, a direction extending parallel to the left or right edge of a rectangular plane including the main channel 1100). That is, in an example, the first microfluidic channel inlet 1111 is formed at an upper portion of the y-axis, and the first microfluidic channel outlet 1112 is formed at a lower portion of the y-axis. However, the positions of the first microfluidic channel inlet 1111 and the first microfluidic channel outlet 1112 may be interchanged. The first fluid is injected into the first microfluidic channel inlet 1111 and is discharged to the first microfluidic channel outlet 1112. In the present embodiment, the first microfluidic channel 1110 has a structure in which an upper portion of the first microfluidic channel 1110 is open so that the first fluid can be pervaporated to the control channel 1200 through the gas permeable member 1300.

The second microfluidic channel 1120 is a passage in which a second fluid flows. The second microfluidic channel 1120 is spaced apart from the first microfluidic channel 1110 on the same plane to face the first microfluidic channel 1110. In the present embodiment, for example, the second microfluidic channel 1120 is formed in a micro size. The second microfluidic channel 1120 includes a second microfluidic channel inlet 1121 and a second microfluidic channel outlet 1122. The second microfluidic channel inlet 1121 is formed to face the first microfluidic channel inlet 1111, and the second microfluidic channel outlet 1122 is formed to face the first microfluidic channel outlet 1112. In the present embodiment, the second microfluidic channel 1120 has a structure in which an upper portion of the second microfluidic channel 1120 is open so that the second fluid can be pervaporated to the control channel 1200 through the gas permeable member 1300.

The bridge channel 1130 has a microfluidic channel structure in which the first microfluidic channel 1110 and the second microfluidic channel 1120 communicate with each other. Referring to FIGS. 1 through 3, the bridge channel 1130 is disposed on the same plane as the first microfluidic channel 1110 and the second microfluidic channel 1120. The bridge channel 1130 is disposed in an x-axis direction crossing a direction in which the first microfluidic channel 1110 and the second microfluidic channel 1120 extend. In the present embodiment, the bridge channel is formed in a micro size or a nano size. The bridge channel 1130 has a structure in which an upper portion of the bridge channel 1130 is open so that the first fluid and the second fluid may be pervaporated to the control channel 1200 through the gas permeable member 1300. In the present embodiment, the first microfluidic channel 1110 and the second microfluidic channel 1120 are formed in a symmetrical structure with respect to the bridge channel 1130.

The control channel 1200 is disposed at an upper portion of the main channel 1100. In this case, the gas permeable member 1300 is disposed between the main channel 1100 and the control channel 1200. That is, the apparatus 1000 for forming a membrane inside a microfluidic channel has a structure in which the main channel 1100, the gas permeable member 1300 and the control channel 1200 are sequentially stacked from bottom to top. The control channel 1200 is a passage in which a control gas in a gaseous state may flow. The control gas flows in the control channel 1200 so that the inside of the control channel 1200 is made dry. This serves so that, when the first fluid and the second fluid are pervaporated to the control channel 1200 through the gas permeable member 1300, the first fluid and the second fluid that are pervaporated are removed and additional pervaporation occurs better from the bridge channel 1130. In detail, when the inside of the control channel 1200 is made dry by injecting the control gas into the control channel 1200, pervaporation occurs in the main channel 1100, and a pervaporation-induced flow (PIF) toward the center of the bridge channel 1130 is generated (promoted). The PIF may be inhibited by injecting a control liquid (not the control gas) into the control channel 1200. That is, the liquid is injected into the control channel 1200 so that the PIF may stop.

In the present embodiment, the control channel 1200 includes a control channel first inlet 1210, a control channel second inlet 1220, and a control channel outlet 1230. A material injected through the control channel first inlet 1210 or the control channel second outlet 1220 is discharged through the control channel outlet 1230. In detail, the control channel first inlet 1210 and the control channel second inlet 1220 are spaced apart from each other in the y-axis direction. The control channel first inlet 1210 extends obliquely in a downward direction of the y-axis, and the control channel second inlet 1220 extends obliquely in an upward direction of the y-axis and meet to communicate with each other. The control channel 1200 extends in parallel to the bridge channel 130 from a portion where the control channel first inlet 1210 and the control channel second inlet 1220 communicate with each other and meet in the x-axis direction. Then, the control channel outlet 1230 is formed at an opposite side to the control channel first inlet 1210 and the control channel second inlet 1220 around the bridge channel 1130. The control channel first inlet 1210 is formed to inject the control gas. The control channel second inlet 1220 is formed to inject the control liquid. The control channel outlet 1230 is formed to discharge the control gas injected into the control channel first inlet 1210 or the control liquid injected into the control channel second inlet 1220. The control channel 1200 is disposed in a direction crossing the first microfluidic channel 1110 and the second microfluidic channel 1120 and is disposed in a direction parallel to the bridge channel 1130. The control channel 1200 is disposed at an upper portion of the bridge channel 1130 to face the bridge channel 1130 and extends.

The gas permeable member 1300 is disposed between the main channel 1100 and the control channel 1200. The gas permeable member 1300 serves to partition and divide the main channel 1100 and the control channel 1200. Also, the gas permeable member 1300 serves to cover the open upper portions of the first microfluidic channel 1110, the second microfluidic channel 1120, and the bridge channel 1130. In this case, the gas permeable member 1300 has a structure in which a liquid does not permeate and a gas permeates. Thus, the first fluid and the second fluid flowing in the main channel 1100 may be pervaporated to the control channel 1200 through the gas permeable member 1300. In the present embodiment, the gas permeable member 1300 is a film having a plate shape. In detail, the gas permeable member 1300 is formed of x-polydimethylsiloxane.

In the preparing of the apparatus for forming the membrane (S110), the first microfluidic channel 1110, the second microfluidic channel 1120, and the bridge channel 1130 are formed as the housing assembly 1100' integrated into the inside of a housing formed of an Ostemer resin. Of course, the type of a resin that constitutes the housing assembly 1100' may be changed.

In the flowing of the fluid (S120), a first fluid in a liquid state for moving first microparticles together flows in the first microfluidic channel 1110. In the present embodiment, for example, the first microparticles are particles having nano sizes of 50 nm to 200 nm. The first microparticles are spherical. A second fluid in a liquid state for moving second microparticles together flows in the second microfluidic channel 1120. In the present embodiment, the second microparticles are particles having nano sizes of 50 nm to 200 nm. The second microparticles are spherical. However, the present invention is not limited thereto, and only the first microparticles may flow together with the first fluid, and only the second microparticles may flow together with the second fluid.

In the present embodiment, the first microparticles and the second microparticles are the same particles so that homogeneous membranes respectively filled in a direction of the first microfluidic channel 1110 and a direction of the second microfluidic channel 1120 may be formed at a middle point of the bridge channel 1130. However, the present invention is not limited thereto, and the first microparticles and the second microparticles may be different from each other so that heterogeneous membranes with microparticles having different properties may be formed in the bridge channel 1130.

Figure 5:
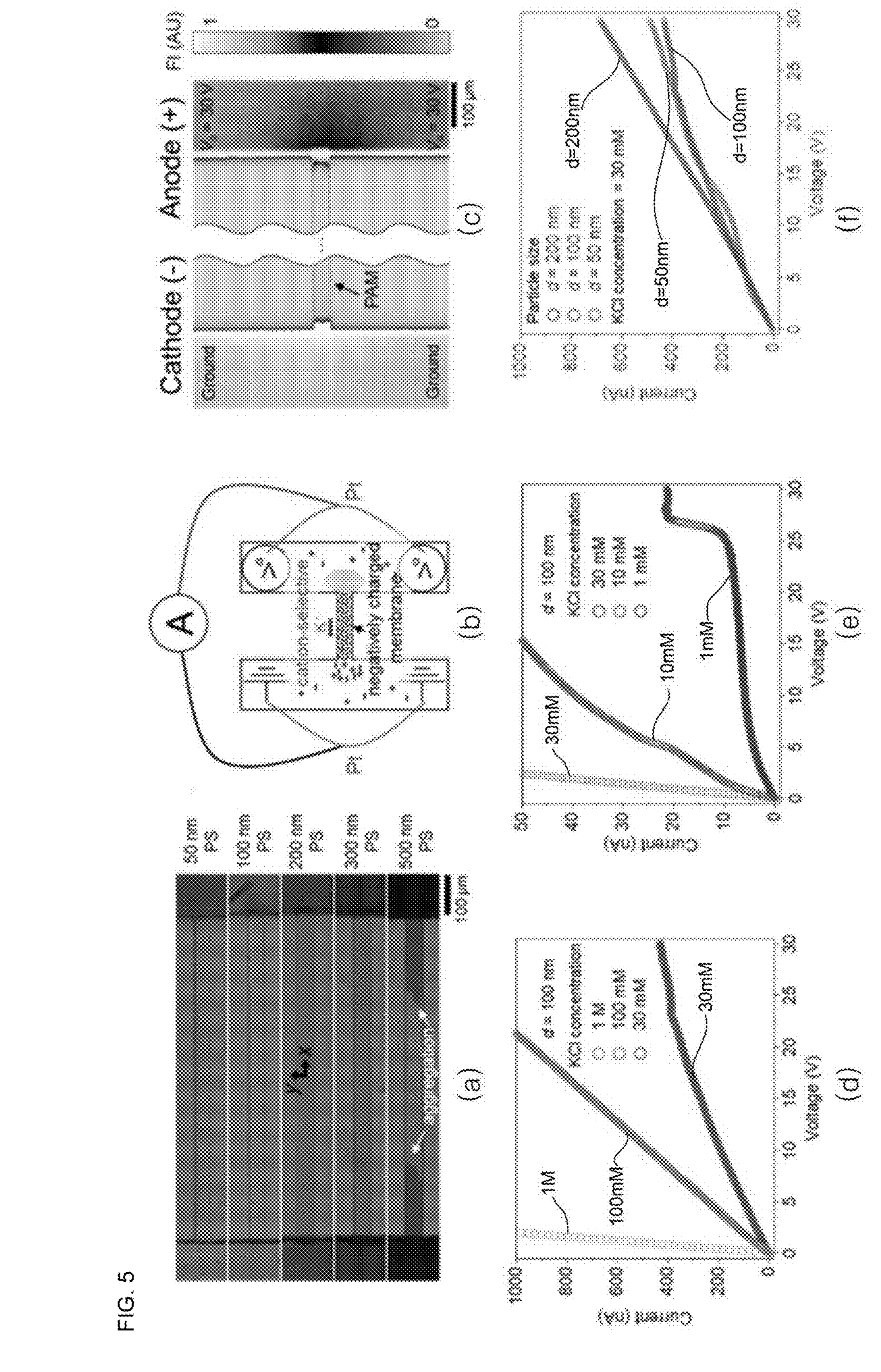
FIG. 5 shows experimental data confirming the usability of the membrane by using a point where the sizes of the pores of the membrane formed by the apparatus for forming the membrane inside the microfluidic channel shown in FIG. 1 can be adjusted and ion-selective material delivery.
Figure 6:
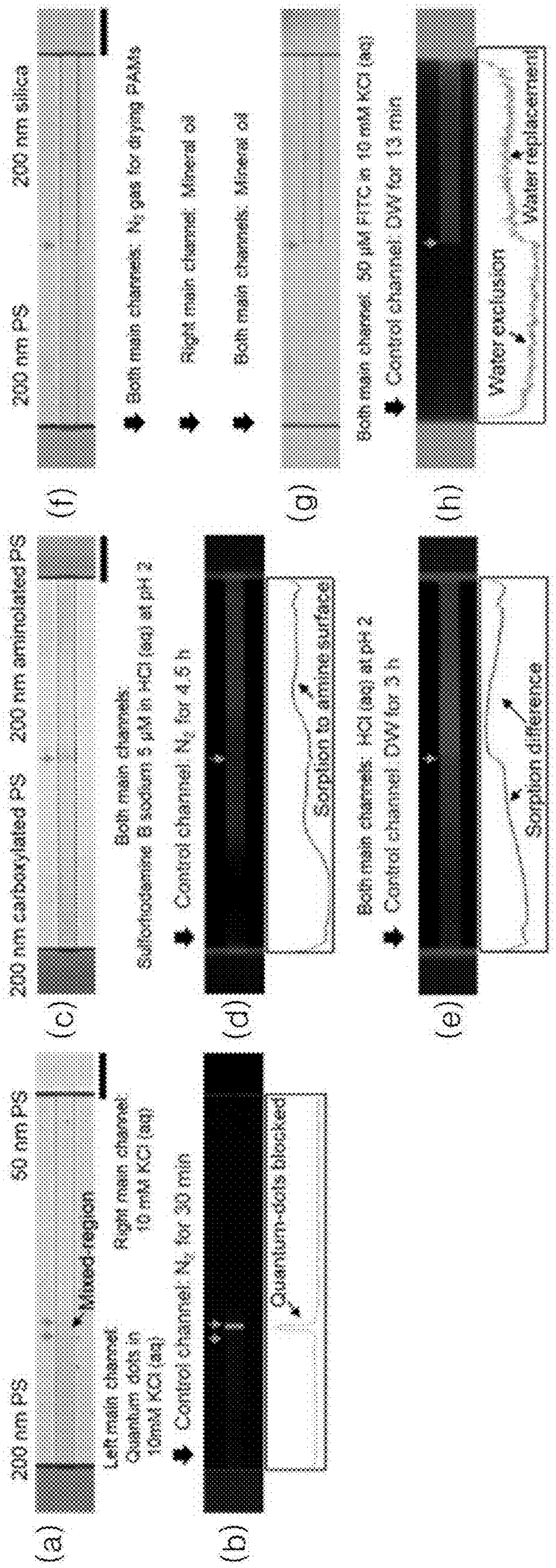
FIG. 6 shows experimental data for visualizing a difference in properties between membranes in a membrane array formed by using the apparatus for forming the membrane inside the microfluidic channel shown in FIG. 1.
Figure 7:
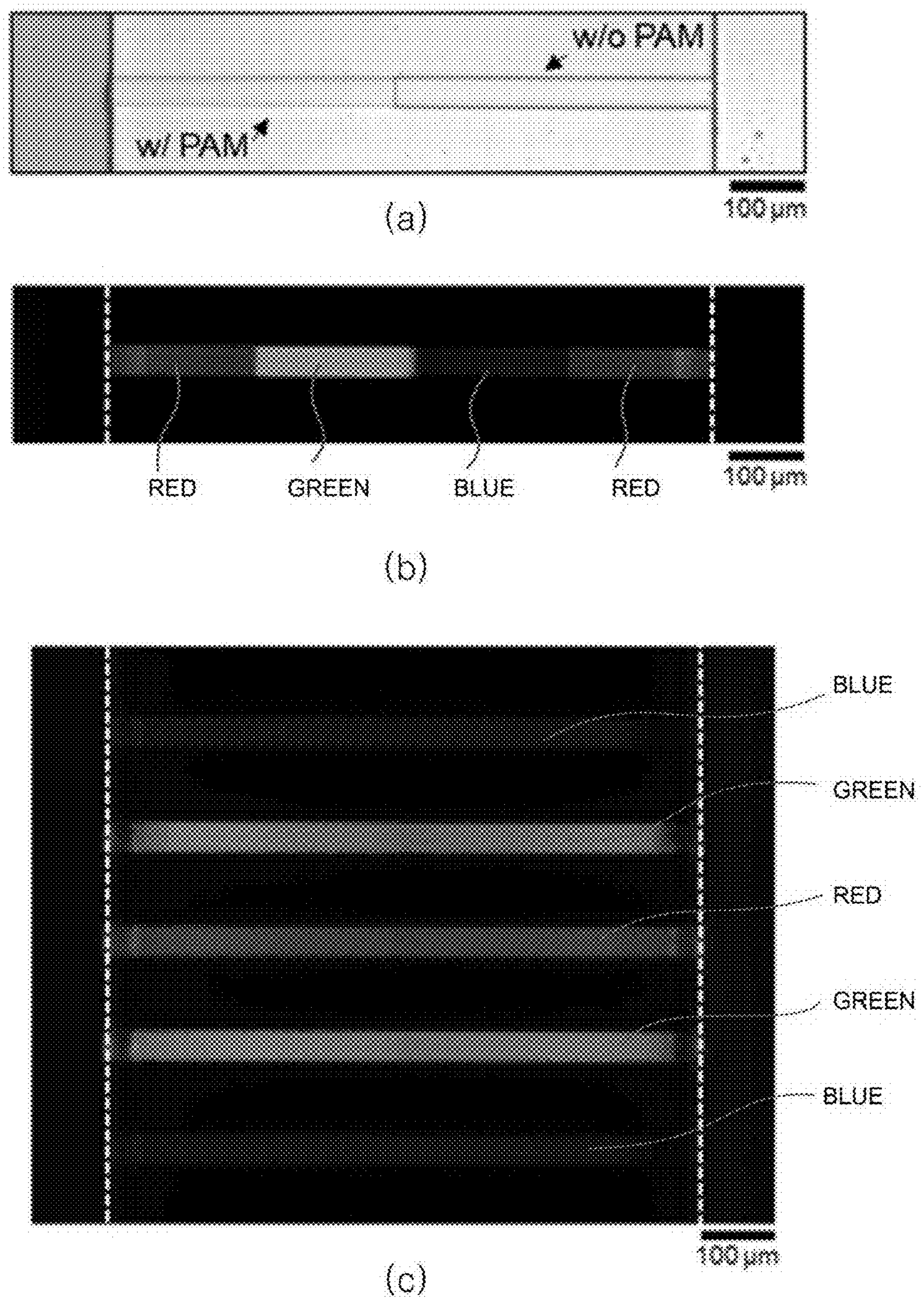
FIG. 7 shows experimental data illustrating a state in which various types of membranes are manufactured by modifying the apparatus for forming the membrane inside the microfluidic channel shown in FIG. 1.

In this case, the first microparticles and the second microparticles may be particles having different sizes, different surface functional groups or different surface wettability (hydrophobicity or hydrophilicity). For example, the first microparticles may have a carboxyl group as a functional group, and the second microparticles may have an amino group. The first microparticles may be polystyrene particles having hydrophobicity, and the second microparticles may be silica particles having hydrophilicity. Referring to FIG. 5, it can be seen that the sizes of the nanopores of a membrane 1140 formed by controlling the sizes of the microparticles may be controlled. Also, it can be seen that the smaller the sizes of the nanopores of the membrane 1140, the lower the ion concentration of the fluid injected into the main channel 1100, the better ion selectivity. Referring to FIG. 6, it can be seen that when the sizes of the first microparticles and the sizes of the second microparticles are different from each other, when surface functional groups are different from each other, and when there is different surface wettability, the heterogeneous membrane 1140 is formed.

In the present embodiment, a membrane is formed of one type or two types of microparticles in the bridge channel 1130. However, the present invention is not limited thereto, and three or more types of microparticles may be serially filled in the bridge channel 1130. In the filling of three types of microparticles, for example, after the first microparticles and second microparticles that are different from the first microparticles are filled in the bridge channel 1130, a third fluid in a liquid state for moving together with third microparticles that are different from the first microparticles and the second microparticles flows in at least one of the first microfluidic channel 1110 and the second microfluidic channel 1120. Of course, after the first fluid for moving the first microparticles together flows in each of the first microfluidic channel 1110 and the second microfluidic channel 1120 so that a membrane formed of the first microparticles is formed, the second fluid for moving the second microparticles together flows in the first microfluidic channel 1110, and the third fluid for moving the third microparticles together flows in the second microfluidic channel 1120 so that a homogeneous membrane can be formed in the center of the bridge channel 1130, and a heterogeneous membrane can be formed at the edge of the bride channel 1130.

In the flowing of the fluid (S120), a control gas in a gaseous state flows in the control channel 1200. In the present embodiment, the control gas is nitrogen ($N_2$), and the type of the control gas may be changed. The control gas is injected into the control channel first inlet 1210.

In the forming of the membrane (S130), the first fluid and the second fluid in the bridge channel 1130 are pervaporated into the control channel 1200 through the gas permeable member 1300 by the flow of the nitrogen gas. When the first microparticles that are moved together by the first fluid together and the second microparticles that are moved together by the second fluid are stagnate in the bridge channel 1130, a membrane having nanopores is formed. The nitrogen gas is injected into the control channel 1200 so that, even when the first fluid and the second fluid are pervaporated into the control channel 1200, the inside of the control channel 1200 is maintained in a dry state.

After the forming of the membrane (S130), in order to inhibit pervaporation of the first fluid and the second fluid, a control liquid is injected into the control channel 1200. This serves to inhibit pervaporation from the first microfluidic channel 1110 and the second microfluidic channel 1120 because the control liquid is injected into the control channel second inlet 1220 so that the control liquid flows in the control channel 1200 and the inside of the control channel 1200 is in a wet state. In the present embodiment, the control liquid is DI-water (DW). However, the type of the control liquid may be changed.

In the present embodiment, a single bridge channel 1130 for communicating the first microfluidic channel 1110 and the second microfluidic channel 1120 with each other is exemplified, but a plurality of bridge channels may be formed to be spaced apart from each other along a direction in which the first microfluidic channel 1110 and the second microfluidic channel 1120 extend. In this case, a plurality of control channels 1200 may be formed to correspond to the number of bridge channels 1130. A membrane 1140 formed of different microparticles may be formed in each of the plurality of bridge channels 1130. Hereinafter, it will be exemplified with reference to FIG. 7 that the bridge channels 1130 include three of a first bridge channel, a second bridge channel, and a third bridge channel. The first bridge channel, the second bridge channel, and the third bridge channel are sequentially spaced apart from each other from top to bottom along the y-axis direction.

First, a first fluid for moving the first microparticles together flows in the first microfluidic channel 1110 or the second microfluidic channel 1120. When the first fluid flows, a control gas is injected into the control channel 1200 arranged on the first bridge channel. When a particle-assembled membrane having nanopores by the first microparticles is formed in the first bridge channel, injection of the control gas into the control channel 1200 is stopped, a control liquid is injected. When a second fluid for moving the second microparticles together flows in the first microfluidic channel 1110 or the second microfluidic channel 1120, flows, a control gas is injected into the control channel 1200 arranged on the second bridge channel. When a particle-assembled membrane having nanopores by the second microparticles is formed in the second bridge channel, injection of the control gas into the control channel 1200 is stopped, a control liquid is injected. When a third fluid for moving the third microparticles together flows in the first microfluidic channel 1110 or the second microfluidic channel 1120, flows, a control gas is injected into the control channel 1200 arranged on the third bridge channel. When a particle-assembled membrane having nanopores by the third microparticles is formed in the third bridge channel, injection of the control gas into the control channel 1200 is stopped, a control liquid is injected. Through this procedure, a membrane including the first microparticles, the second microparticles, and the third microparticles is formed in the first bridge channel, the second bridge channel, and the third bridge channel, respectively. Thus, membranes arranged in parallel along a direction in which the first microfluidic channel 1110 and the second microfluidic channel 1120 extend, may be manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of manufacturing a microfluidic channel with a membrane formed therein, the method comprising:

preparing an apparatus for forming a membrane, the apparatus for forming the membrane comprising a first microfluidic channel, a second microfluidic channel being spaced apart from the first microfluidic channel, a bridge channel having a microchannel structure for communicating the first microfluidic channel and the second microfluidic channel with each other, and a control channel, which is partitioned by a gas permeable member from the bridge channel and through which gas flows;

a fluid flowing operation in which a first fluid in a liquid state for moving first microparticles flows in the first microfluidic channel and a control gas in a gaseous state flows in the control channel; and forming a membrane having nanopores while the first fluid in the bridge channel is pervaporated to the control channel by flow of the control gas through the gas permeable member and the first microparticles that are moved together by the first fluid are stagnate in the bridge channel.

2. The method of claim 1, wherein, in the fluid flowing operation, a second fluid in a liquid state for moving second microparticles together flows in the second microfluidic channel.

3. The method of claim 2, wherein, in the fluid flowing operation, the first microparticles and the second microparticles are same microparticles so that the first microparticles and the second microparticles are filled in a direction of the first microfluidic channel and in a direction of the second microfluidic channel, respectively, at a middle point of the bridge channel.

4. The method of claim 1, wherein, in the forming of the membrane, a nitrogen gas is injected into the control channel and flows in the control channel so that, even when the first fluid is pervaporated to the control channel, an inside of the control channel is maintained in a dry state.

5. The method of claim 1, wherein, in the preparing of the apparatus for forming the membrane, the first microfluidic channel has a structure in which the first fluid is pervaporated to the control channel through the gas permeable member.

6. The method of claim 1, wherein, in the preparing of the apparatus for forming the membrane, the bridge channel has a structure in which an upper portion of the bridge channel is open so that the first fluid is pervaporated.

7. The method of claim 1, wherein, in the fluid flowing operation, the first microparticles are particles having nano sizes.

8. The method of claim 7, wherein, in the fluid flowing operation, the first microparticles have sizes of 50 nm to 200 nm.

9. The method of claim 1, wherein, in the preparing of the apparatus for forming the membrane, the first microfluidic channel, the second microfluidic channel, and the bridge channel are arranged on a same plane, the gas permeable member is arranged on the first microfluidic channel, the second microfluidic channel and the bridge channel, and the control channel is arranged on the gas permeable member.

10. The method of claim 9, wherein, in the preparing of the apparatus for forming the membrane, the apparatus further comprises a housing in which the first microfluidic channel, the second microfluidic channel, the bridge channel, the gas permeable member and the control channel are integrally formed inside the housing.

11. The method of claim 2, wherein, in the fluid flowing operation, the first microparticles and the second microparticles are different microparticles so that the first microparticles and the second microparticles are filled in the direction of the first microfluidic channel and in the direction of the second microfluidic channel, respectively, at a point other than the middle point of the bridge channel.

12. The method of claim 11, wherein, in the fluid flowing operation, the first microparticles and the second microparticles are particles having different sizes, or particles having different surface functional groups, or particles having different surface wettability.

13. The method of claim 2, wherein, in the fluid flowing operation, in order to fill three different types of microparticles in the bridge channel, after the first microparticles and the second microparticles different from the first microparticles are filled, a third fluid in a liquid state for moving third microparticles that are different from the first microparticles and the second microparticles together to at least one of the first microfluidic channel and the second microfluidic channel.

14. The method of claim 1, wherein, in the preparing of the apparatus for forming the membrane, a plurality of bridge channels are formed to be spaced apart from each other in a direction in which the first microfluidic channel and the second microfluidic channel extend, and in the fluid flowing operation, a first fluid for moving the first microparticles together, a second fluid for moving the second microparticles together, and a third fluid for moving the third microparticles together sequentially flow in the first microfluidic channel and the second microfluidic channel, and in the forming of the membrane, when the first fluid flows, the control gas is injected into a first bridge channel among the plurality of bridge channels, and when the second fluid flows, the control gas is injected into a second bridge channel among the plurality of bridge channels, and when the third fluid flows, the control gas is injected into a third bridge channel among the plurality of bridge channels so that different membranes are formed in the plurality of bridge channels, respectively.

15. The method of claim 1, after the forming of the membrane, further comprising flowing a control liquid in the control channel so as to inhibit flow of the first fluid.

16. The method of claim 1, wherein, in the preparing of the apparatus for forming the membrane, the gas permeable member is a film having a plate shape.

* * * * *